United States Patent
Omoda et al.

(10) Patent No.: US 12,529,647 B2
(45) Date of Patent: Jan. 20, 2026

(54) METAL MATERIAL CORROSION LOSS MAPPING METHOD, METAL MATERIAL SELECTION METHOD, AND METAL MATERIAL CORROSION LOSS MAPPING APPARATUS

(71) Applicant: JFE STEEL CORPORATION, Tokyo (JP)

(72) Inventors: Masataka Omoda, Tokyo (JP); Kazuhiro Nakatsuji, Tokyo (JP); Daisuke Mizuno, Tokyo (JP); Shinji Ootsuka, Tokyo (JP)

(73) Assignee: JFE STEEL CORPORATION, Tokyo (JP)

( * ) Notice: Subject to any disclaimer, the term of this patent is extended or adjusted under 35 U.S.C. 154(b) by 512 days.

(21) Appl. No.: 17/774,328

(22) PCT Filed: Oct. 6, 2020

(86) PCT No.: PCT/JP2020/037822
§ 371 (c)(1),
(2) Date: May 4, 2022

(87) PCT Pub. No.: WO2021/100341
PCT Pub. Date: May 27, 2021

(65) Prior Publication Data
US 2022/0390353 A1    Dec. 8, 2022

(30) Foreign Application Priority Data
Nov. 18, 2019    (JP) ................................. 2019-207598

(51) Int. Cl.
*G01N 17/00*    (2006.01)
*G06F 16/29*    (2019.01)
(Continued)

(52) U.S. Cl.
CPC ........... *G01N 17/006* (2013.01); *G06F 16/29* (2019.01); *G06F 16/909* (2019.01); *G06T 17/05* (2013.01)

(58) Field of Classification Search
CPC ........ G01N 17/006; G06F 16/29; G06T 17/05
See application file for complete search history.

(56) References Cited

U.S. PATENT DOCUMENTS

| 10,317,358 B1 | 6/2019 | Sagues et al. |
| 2002/0072878 A1* | 6/2002 | Kanehira ............... G01N 17/00 702/183 |

(Continued)

FOREIGN PATENT DOCUMENTS

| CN | 107589063 A | 1/2018 |
| JP | 2003-161693 A | 6/2003 |

(Continued)

OTHER PUBLICATIONS

"Joint research report on application of corrosion resisting steel to bridges (XVIII)", Institute of Civil Engineering of the Ministry of Construction, the Kozai Club, and Japan Bridge Association, Mar. 1993.

(Continued)

*Primary Examiner* — Lisa M Caputo
*Assistant Examiner* — Sharah Zaab
(74) *Attorney, Agent, or Firm* — Oliff PLC (57) ABSTRACT

A metal material corrosion loss mapping method includes creating a corrosion loss prediction map by using corrosion loss data including a use period of a metal material, a plurality of environmental parameters, position coordinates of the environmental parameters on a map, topographical data of the map, and a corrosion loss of the metal material. The metal material corrosion loss mapping method includes: an environment map creation step of creating an environ- (Continued)

ment map at certain mesh intervals based on the environmental parameters, the topographical data of the map, and the position coordinates of the environmental parameters; a prediction request point input step; a similarity degree calculation step; a corrosion loss prediction step; and a corrosion loss prediction map creation step of creating a corrosion loss prediction map by coloring a prediction result of the corrosion loss at the prediction request point in the mesh.

10 Claims, 5 Drawing Sheets (51) Int. Cl.
  *G06F 16/909* (2019.01)
  *G06T 17/05* (2011.01)

(56) References Cited

U.S. PATENT DOCUMENTS

| | | | | |
|---|---|---|---|---|
| 2005/0213430 | A1* | 9/2005 | Jovancicevic | G01N 17/006 367/87 |
| 2006/0288756 | A1* | 12/2006 | De Meurechy | G01N 21/49 73/1.01 |
| 2021/0072144 | A1 | 3/2021 | Omoda et al. | |

FOREIGN PATENT DOCUMENTS

| | | | | |
|---|---|---|---|---|
| JP | 2006-284432 | A | | 10/2006 |
| JP | 2007-107882 | A | | 4/2007 |
| JP | 3909057 | B2 | | 4/2007 |
| JP | 2007107882 | * | | 4/2007 ............ G01N 17/00 |
| JP | 2008-224405 | A | | 9/2008 |
| JP | 4143018 | B2 | | 9/2008 |
| JP | 2008224405 | * | | 9/2008 ............ G01N 17/04 |
| JP | 4706254 | B2 | | 6/2011 |
| JP | 2012-013673 | A | | 1/2012 |
| JP | 2012-103673 | A | | 5/2012 |
| JP | 5066160 | B2 | | 11/2012 |
| JP | 5066955 | B2 | | 11/2012 |
| JP | 5684552 | B2 | | 3/2015 |
| JP | 5895522 | B2 | | 3/2016 |
| KR | 20180047073 | * | | 5/2018 ............ G01N 17/00 |
| WO | 2017/135361 | A1 | | 8/2017 |
| WO | 2019/135361 | A1 | | 7/2019 |

OTHER PUBLICATIONS

ISO 9223: 1992 "Corrosion of metals and alloys—Corrosivity of atmospheres—Classification, determination and estimation".
Dec. 14, 2021 Office Action issued in Japanese Patent Application No. 2021-513482.
Apr. 5, 2022 Office Action issued in Japanese Patent Application No. 2021-513482.
Kim Sanghong, Okajima Ryota, Kano Manabu, and Hasebe Shinji, "Sample selection to construct accurate locally qeighted PLS models", 54th Automatic Control Joint Lecture Meeting, 54(2011), p. 1594.
Dec. 22, 2020 International Search Report issued in International Patent Application No. PCT/JP2020/037822.
Jul. 31, 2024 Office Action issued in Korean Patent Application No. 10-2022-7017587 (with partial translation).
Mar. 12, 2025 Office Action issued in Chinese Patent Application No. 202080079321.9 (with partial translation).
Jiang et al., "Near-surface air temperature lapse rates and seasonal and type differences in China", Progress in Geography, vol. 35, No. 12, Dec. 2016.
Sep. 1, 2025 Office Action issued in Chinese Patent Application No. 202080079321.9 (with English translation of Search Report).
Zhou, Tingting, et al. "Comparison of the Temperature Spatial Interpolation Methods Based on MODIS and Meteorological Observation Data", Progress in Geography, vol. 30, No. 9, Institute of Geography, Fujian Normal University, Geomatics Center of Fujian Province, Sep. 2011.

* cited by examiner

METAL MATERIAL CORROSION LOSS MAPPING METHOD, METAL MATERIAL SELECTION METHOD, AND METAL MATERIAL CORROSION LOSS MAPPING APPARATUS

FIELD

The present invention relates to a metal material corrosion loss mapping method, a metal material selection method, and a metal material corrosion loss mapping apparatus.

BACKGROUND

As described in Non Patent Literature 1, it is conventionally known that a corrosion loss of a metal material in an atmospheric corrosive environment is represented by Expression (1) below as an empirical expression.

$$Y = AX^B \qquad (1)$$

In Expression (1) above, Y is a corrosion loss of a metal material, X is a use period of the metal material, A is a parameter indicating a corrosion loss of the metal material in an initial 1 year, and B is a parameter indicating attenuation of a corrosion rate by the effect of a rust layer formed by corrosion. The values of these parameters A and B change by the type of the metal material and the atmospheric corrosive environment. Thus, in predicting a long-term corrosion loss, a method is currently frequently being used that exposes a metal material to an atmospheric corrosive environment to be examined for a plurality of periods and extrapolates a temporal change in corrosion loss with Expression (1) above.

The corrosion loss of a metal material is determined through action of the corrosion resistance of metal and atmospheric corrosive environmental factors such as temperature, relative humidity, time of wetness, rainfall, amount of airborne sea salt, and $SO_2$ concentration in a complicated manner. Given these circumstances, techniques that predict the corrosion loss of a metal material through formulation using the environmental factors have been presented as described below.

Non Patent Literature 2 calculates, for carbon steel, zinc, copper, and aluminum, the logarithm of a corrosion loss with the sum of a term multiple regressed with the logarithm of temperature, relative humidity, and airborne salt and a term multiple regressed with the logarithm of temperature, relative humidity, and amount of $SO_2$ deposition, for example.

Patent Literature 1 represents a corrosion indicator Z as Expression (2) below with annual time of wetness, annually averaged wind velocity, amount of airborne sea salt, amount of sulfur oxide deposition, the activation energy of a corrosion reaction, and temperature as parameters and uses a quadratic function of this corrosion indicator Z for the calculation of a long-term corrosion loss.

$$Z = a \cdot TOW \cdot \exp(-\kappa \cdot W) \cdot \frac{C + \delta \cdot S}{1 + \varepsilon \cdot C \cdot S} \cdot \exp\left(\frac{-E_\alpha}{R \cdot T}\right) \qquad (2)$$

In Expression (2) above, TOW is annual time of wetness (h), W is annually averaged wind velocity (m/s), C is amount of airborne sea salt (mdd), S is amount of sulfur oxide deposition (mdd), $E_\alpha$ is the activation energy (J/mol) of the corrosion reaction, R is the gas constant (J/(K/mol)), T is annually averaged temperature (K), and a, $\kappa$, $\delta$, and $\varepsilon$ are constants. The above "mdd" is the amount of NaCl collected per unit number of days and unit area and is an abbreviation of "mg NaCl·$dm^{-2}$·$day^{-1}$".

Patent Literature 2 presents a technique that predicts an amount of airborne sea salt C. Patent Literature 3 presents a corrosion prediction technique that calculates the parameter A in Expression (1) above known as an empirical expression by Expression (3) below with temperature, relative humidity, amount of airborne sea salt, and wetness probability as parameters and calculates the parameter B as a function of the parameter A by a laboratory experiment.

$$A = (\alpha \cdot T + \beta) \cdot Pw(T, H) \cdot (Sa^\gamma) \qquad (3)$$

In Expression (3) above, T is temperature (° C.), H is relative humidity (%), Sa is amount of airborne sea salt (mg/$dm^2$/day (=mdd)), Pw(T, H) is wetness probability, and $\alpha$, $\beta$, and $\gamma$ are coefficients set in accordance with a steel type.

Patent Literature 4 presents a corrosion prediction technique that calculates the parameter A in Expression (1) above known as an empirical expression by Expression (4) below with temperature, time of wetness, and amount of airborne sea salt as parameters and sets the parameter B to be a range of 0.3 to 0.6 in an outdoor atmospheric corrosive environment.

$$A = kT^\alpha \cdot TOW^\beta \cdot Sa^\gamma \qquad (4)$$

In Expression (4) above, T is temperature (° C.), TOW is time of wetness (h), Sa is amount of airborne sea salt (mg/$dm^2$/day (=mdd)), and $\alpha$, $\beta$, and $\gamma$ are coefficients.

Patent Literature 5 presents a technique that calculates the parameter A in Expression (1) above known as an empirical expression by Expression (5) below and the parameter B by Expression (6) below when predicting a plate thickness reduction of a steel material in an atmospheric environment.

$$A = (CR0 + CR1) \div 2 \qquad (5)$$

$$B = 2CR1 \div (CR0 + CR1) \qquad (6)$$

In Expression (5) above and Expression (6) above, CR0 is a function representing an initial corrosion rate immediately after production of a steel material with environmental factors as parameters, whereas CR1 is a function representing a corrosion rate 1 year after production of the steel material with the environmental factors as parameters. The environmental factors in this example indicate annually averaged temperature (° C.), annually averaged humidity (%), annually averaged wind velocity (m/sec), amount of airborne sea salt (mg/$dm^2$/day (=mdd)), and amount of sulfur oxide deposition (mg/$dm^2$/day (=mdd)).

Patent Literature 6, when predicting a corrosion rate of a metal material, performs multiple regression analysis with the corrosion rate as a response variable and with environmental factors and terrain factors having an influence on the corrosion rate as explanatory variables. In conducting this multiple regression analysis, virtual time of wetness with weighting performed in accordance with a relative humidity of 0% to 100% is included as at least one of the explanatory variables. Patent Literature 6 presents a method that determines this virtual time of wetness by summing multiplied values obtained by multiplying time corresponding to changing relative humidity by a weight coefficient varying in accordance with the changing relative humidity, and creates a corrosion rate estimation expression by multiple regression analysis based on the measured corrosion rate of the metal material.

Patent Literature 7 presents, as a technique for mapping (creating a map of) predicted results of corrosion loss, a technique that predicts the corrosion rate of a metal material by multiple regression analysis optimized using the stepwise method, and maps the corrosion rate of the metal material by clustering.

CITATION LIST

Patent Literature

Patent Literature 1: Japanese Patent No. 3909057
Patent Literature 2: Japanese Patent No. 4143018
Patent Literature 3: Japanese Patent No. 4706254
Patent Literature 4: Japanese Patent No. 5895522
Patent Literature 5: Japanese Patent No. 5066160
Patent Literature 6: Japanese Patent No. 5066955
Patent Literature 7: Japanese Patent No. 5684552

Non Patent Literature

Non Patent Literature 1: "Joint research report on application of corrosion resisting steel to bridges (XVIII)", Institute of Civil Engineering of the Ministry of Construction, the Kozai Club, and Japan Bridge Association, March, 1993
Non Patent Literature 2: ISO 9223: 1992 "Corrosion of metals and alloys—Corrosivity of atmospheres—Classification, determination and estimation"

SUMMARY

Technical Problem

Patent Literature 1 to 5 evaluate the relation between the corrosion loss and the corrosion rate and the environmental parameters to select the environmental parameters to be employed as the explanatory variables and to perform formulation. However, the corrosion loss, the corrosion rate, and the environmental parameters have a correlation in a complicated manner. The relation between the corrosion loss and temperature is nonlinear, whereas amount of airborne sea salt and $SO_2$ concentration have a pseudocorrelation, for example. In such a correlation, when formulation is performed as in Patent Literature 1 to 5, high-accuracy prediction is not expected.

Patent Literature 6 is characterized in that weighting is performed focusing on time of wetness. By thus performing weighting, accuracy increases, but even if weighting is performed only on time of wetness among the many environmental parameters, effective accuracy improvement is not expected. The method of Patent Literature 6 can perform corrosion prediction only in a period currently having data and cannot perform long-term corrosion prediction.

Patent Literature 7 improves prediction accuracy by classifying data with clustering, selecting a plurality of environmental parameters out of many environmental parameters in each cluster, and repeatedly performing multiple regression to make the best expression. However, the relation between the corrosion loss and the corrosion rate cannot simply be represented by a linear expression with the environmental parameters obtained by multiple regression. Consequently, significant accuracy improvement is not expected by the method of Patent Literature 7.

The method disclosed in Patent Literature 7 acquires the environmental parameters of a prediction point, for example, for each 1 km square mesh in the case of Japan, are obtained from publicly available data (e.g., "agricultural weather data" provided by the National Agriculture and Food Research Organization, etc.). However, such data do not cover all environmental parameters such as amount of airborne sea salt and $SO_2$ concentration. In addition, the method disclosed in Patent Literature 7 does not specify how to interpolate the missing environmental parameters. Therefore, even if the method disclosed in Patent Literature 7 is used for clustering and prediction of corrosion loss using only known environmental parameters, it is considered that only a low accuracy corrosion loss prediction map can be created.

The present invention has been made in view of the above, and an object thereof is to provide a metal material corrosion loss mapping method, a metal material selection method, and a metal material corrosion loss mapping apparatus that can map a corrosion loss of a metal material in an atmospheric corrosive environment with high accuracy.

Solution to Problem

To solve the above-described problem and achieve the object, a metal material corrosion loss mapping method according to the present invention includes: predicting a corrosion loss of a metal material using corrosion loss data, the corrosion loss data including a use period of the metal material, a plurality of environmental parameters indicating a use environment of the metal material in the use period and being known on a map indicating a region in which the metal material is used, position coordinates of the environmental parameters on the map, topographical data of the map, and a corrosion loss of the metal material in the use period; and creating a corrosion loss prediction map, wherein the metal material corrosion loss mapping method includes: an environment map creation step of creating an environment map for each of the environmental parameters at certain mesh intervals based on the environmental parameters, the topographical data of the map, and the position coordinates of the environmental parameters on the map; a prediction request point input step of inputting a prediction request point including a use period of the metal material for which the corrosion loss prediction map is created and a plurality of environmental parameters in the corrosion loss data; a similarity degree calculation step of calculating a similarity degree between the environmental parameters in the corrosion loss data and the environmental parameters in the prediction request point; a dimension compression step of dimensionally compressing the environmental parameters in the corrosion loss data to a latent variable considering the similarity degree; a corrosion loss prediction step of predicting a corrosion loss of the metal material in the prediction request point in the mesh based on a prediction expression constructed using the latent variable and the similarity degree; and a corrosion loss prediction map creation step of creating a corrosion loss prediction map by coloring a prediction result of the corrosion loss at the prediction request point in the mesh.

Moreover, in the above-described metal material corrosion loss mapping method according to the present invention, the environment map creation step includes a first step of inputting the environmental parameters to the position coordinates on the map, a second step of correcting the environment map to an environment map at 0 m above sea level based on the topographical data of the map, a third step of interpolating environmental parameters between the environmental parameters on the environment map at 0 m above sea level, and a fourth step of correcting the environment map at 0 m above sea level with the interpolated environmental parameters to the environment map at the original height above sea level based on the topographical data of the map.

Moreover, in the above-described metal material corrosion loss mapping method according to the present invention, the environmental parameters include amount of airborne sea salt, and the third step interpolates amount of airborne sea salt such that the amount of airborne sea salt does not exceed a predetermined upper limit when interpolating amount of airborne sea salt in a mesh close to a coastline.

Moreover, in the above-described metal material corrosion loss mapping method according to the present invention, the corrosion loss prediction step includes: an initial corrosion loss prediction step of predicting a first parameter indicating a corrosion loss of the metal material in a certain period; an attenuation prediction step of predicting a second parameter indicating attenuation of a corrosion rate of the metal material; and a long-term corrosion loss prediction step of predicting a corrosion loss of the metal material in a period longer than the certain period based on the use period of the metal material, the first parameter, and the second parameter.

Moreover, in the above-described metal material corrosion loss mapping method according to the present invention, the initial corrosion loss prediction step predicts a corrosion loss of the metal material in a certain period under the environmental parameters in the prediction request point based on the prediction expression constructed using the latent variable and the similarity degree.

Moreover, in the above-described metal material corrosion loss mapping method according to the present invention, the attenuation prediction step predicts the second parameter based on the use period of the metal material for which the corrosion loss prediction map is created, the environmental parameters in the corrosion loss data, and the similarity degree.

Moreover, in the above-described metal material corrosion loss mapping method according to the present invention, the environmental parameters include at least one of temperature, relative humidity, absolute humidity, time of wetness, and rainfall, and at least one of amount of airborne sea salt, $SO_x$ concentration, and $NO_x$ concentration.

Moreover, in the above-described metal material corrosion loss mapping method according to the present invention, the metal material is a steel material.

Moreover, in the above-described metal material corrosion loss mapping method according to the present invention, the corrosion loss prediction map is a map that is colored for each mesh according to a corrosion loss value predicted at the corrosion loss prediction map creation step.

To solve the above-described problem and achieve the object, a metal material selection method according to the present invention includes selecting a metal material corresponding to a use environment using the metal material corrosion loss mapping method.

To solve the above-described problem and achieve the object, a metal material corrosion loss mapping apparatus according to the present invention includes: a database configured to store therein corrosion loss data including a use period of a metal material, a plurality of environmental parameters indicating a use environment of the metal material in the use period and being known on a map indicating a region in which the metal material is used, position coordinates of the environmental parameters on the map, topographical data of the map, and a corrosion loss of the metal material in the use period; an environment map creation unit configured to create an environment map for each of the environmental parameters at certain mesh intervals based on the environmental parameters, the topographical data of the map, and the position coordinates of the environmental parameters on the map; an input unit to which a prediction request point is input, the prediction request point including a use period of the metal material for which the corrosion loss prediction map is created and a plurality of environmental parameters in the corrosion loss data; a similarity degree calculation unit configured to calculate a similarity degree between the environmental parameters in the corrosion loss data and the environmental parameters in the prediction request point; a dimension compression unit configured to dimensionally compress the environmental parameters in the corrosion loss data to a latent variable considering the similarity degree; a corrosion loss prediction unit configured to predict a corrosion loss of the metal material in the prediction request point in the mesh based on a prediction expression constructed using the latent variable and the similarity degree; and a corrosion loss prediction map creation unit configured to create a corrosion loss prediction map by coloring a prediction result of the corrosion loss at the prediction request point in the mesh.

The present invention is based on the above findings and is summarized as follows.

[1]

A metal material corrosion loss mapping method that predicts a corrosion loss of a metal material using corrosion loss data and creates a corrosion loss prediction map, the corrosion loss data including a use period of the metal material, a plurality of environmental parameters indicating a use environment of the metal material in the use period and being known on a map indicating a region in which the metal material is used, position coordinates of the environmental parameters on the map, topographical data of the map, and a corrosion loss of the metal material in the use period, the method including:

an environment map creation step of creating an environment map for each of the environmental parameters at certain mesh intervals based on the environmental parameters, the topographical data of the map, and the position coordinates of the environmental parameters on the map;

a prediction request point input step of inputting a prediction request point including a use period of the metal material for which the corrosion loss prediction map is created and a plurality of environmental parameters in the corrosion loss data;

a similarity degree calculation step of calculating a similarity degree between the environmental parameters in the corrosion loss data and the environmental parameters in the prediction request point;

a dimension compression step of dimensionally compressing the environmental parameters in the corrosion loss data to a latent variable considering the similarity degree;

a corrosion loss prediction step of predicting a corrosion loss of the metal material in the prediction request point in the mesh based on a prediction expression constructed using the latent variable and the similarity degree; and a corrosion loss prediction map creation step of creating a corrosion loss prediction map by coloring a prediction result of the corrosion loss at the prediction request point in the mesh.

[2]
The metal material corrosion loss mapping method according to [1], in which
the environment map creation step includes
a first step of inputting the environmental parameters to the position coordinates on the map,
a second step of correcting the environment map to an environment map at 0 m above sea level based on the topographical data of the map,
a third step of interpolating environmental parameters between the environmental parameters on the environment map at 0 m above sea level, and
a fourth step of correcting the environment map at 0 m above sea level with the interpolated environmental parameters to the environment map at the original sea level based on the topographical data of the map.

[3]
The metal material corrosion loss mapping method according to [2], in which
the environmental parameters include amount of airborne sea salt, and
the third step interpolates amount of airborne sea salt such that the amount of airborne sea salt does not exceed a predetermined upper limit when interpolating amount of airborne sea salt in a mesh close to a coastline.

[4]
The metal material corrosion loss mapping method according to any one of [1] to [3], in which the corrosion loss prediction step includes:
an initial corrosion loss prediction step of predicting a first parameter indicating a corrosion loss of the metal material in a certain period;
an attenuation prediction step of predicting a second parameter indicating attenuation of a corrosion rate of the metal material; and
a long-term corrosion loss prediction step of predicting a corrosion loss of the metal material in a period longer than the certain period based on the use period of the metal material, the first parameter, and the second parameter.

[5]
The metal material corrosion loss mapping method according to [4], in which the initial corrosion loss prediction step predicts a corrosion loss of the metal material in a certain period under the environmental parameters in the prediction request point based on the prediction expression constructed using the latent variable and the similarity degree.

[6]
The metal material corrosion loss mapping method according to [4], in which the attenuation prediction step predicts the second parameter based on the use period of the metal material for which the corrosion loss prediction map is created, the environmental parameters in the corrosion loss data, and the similarity degree.

[7]
The metal material corrosion loss mapping method according to any one of [1] to [6], wherein the environmental parameters include at least one of temperature, relative humidity, absolute humidity, time of wetness, and rainfall, and at least one of amount of airborne sea salt, $SO_x$ concentration, and $NO_x$ concentration.

[8]
The metal material corrosion loss mapping method according to any one of [1] to [4], in which the metal material is a steel material.

[9]
The metal material corrosion loss mapping method according to any one of [1] to [8], in which the corrosion loss prediction map is a map that is colored for each mesh according to a corrosion loss value predicted at the corrosion loss prediction map creation step.

[10]
A metal material selection method including selecting a metal material corresponding to a use environment using the metal material corrosion loss mapping method according to any one of [1] to [9].

[11]
A metal material corrosion loss mapping apparatus including:
a database storing therein corrosion loss data including a use period of a metal material, a plurality of environmental parameters indicating a use environment of the metal material in the use period and being known on a map indicating a region in which the metal material is used, position coordinates of the environmental parameters on the map, topographical data of the map, and a corrosion loss of the metal material in the use period;
an environment map creation unit creating an environment map for each of the environmental parameters at certain mesh intervals based on the environmental parameters, the topographical data of the map, and the position coordinates of the environmental parameters on the map;
an input unit to which a prediction request point is input, the prediction request point including a use period of the metal material for which the corrosion loss prediction map is created and a plurality of environmental parameters in the corrosion loss data;
a similarity degree calculation unit calculating a similarity degree between the environmental parameters in the corrosion loss data and the environmental parameters in the prediction request point;
a dimension compression unit dimensionally compressing the environmental parameters in the corrosion loss data to a latent variable considering the similarity degree;
a corrosion loss prediction unit predicting a corrosion loss of the metal material in the prediction request point in the mesh based on a prediction expression constructed using the latent variable and the similarity degree; and
a corrosion loss prediction map creation unit creating a corrosion loss prediction map by coloring a prediction result of the corrosion loss at the prediction request point in the mesh.

Advantageous Effects of Invention

According to the present invention, a corrosion loss of a metal material can be mapped with high accuracy in an atmospheric corrosive environment, and an optimum metal material having corrosion resistance corresponding to a use environment can be selected.

DESCRIPTION OF EMBODIMENTS

The following describes a metal material corrosion loss mapping method, a metal material selection method, and a metal material corrosion loss mapping apparatus according to an embodiment of the present invention with reference to the accompanying drawings. The following embodiment does not limit the present invention.

(Interpolating Environmental Parameters)

There is a complex correlation between a metal material and a corrosion loss in the atmosphere and various environmental parameters. In the international standard ISO9223, presented above as Non Patent Literature 2, an annually averaged corrosion loss is formulated based on the annually averaged temperature, relative humidity, amount of airborne sea salt, and $SO_x$ concentration. However, it is difficult to obtain these environmental parameters at narrow mesh intervals of, for example, 1 km or 2 km on a map, and thus it is necessary to interpolate the environmental parameters between the position coordinates of each environmental parameter based on the position coordinates of the available environmental parameters.

In this case, for example, the temperature varies not only with longitude and latitude, but also with altitude. The way in which airborne salts are dispersed also varies depending on the influence of mountains, hills, and other obstacles. Therefore, it is necessary to interpolate the environmental parameters while taking into account the influence of such topography.

However, it is difficult to reflect the topographical data and interpolate the environmental parameters between the position coordinates in a single operation. Therefore, the present embodiment first corrects a plurality of environment maps on which a plurality of known environmental parameters are plotted to a plurality of environment maps expressed in terms of 0 m above sea level. Then, the present embodiment creates environment maps at 0 m above sea level on which the environmental parameters between the position coordinates are interpolated. Then, by correcting the environmental parameters after interpolation according to the actual topographical data, the environment maps at the original height above sea level are created. The above "environment map" refers to a map on which the environmental parameters are plotted. The following describes specific interpolation methods for environmental parameters.

(Interpolating Temperature)

For interpolating temperature, first, available temperature data is plotted on a map. Next, based on the law that "a 100 m decrease in elevation results in a 0.6° C. increase in temperature" (temperature decrease rate), the temperature values at the plot points are corrected to values converted in terms of 0 m above sea level using topographical data. The temperature between pieces of the data is then interpolated at certain mesh intervals. The mesh intervals should be determined according to the number of environmental parameters known on the map and the machine specifications at the time of calculation.

There are various methods of data interpolation, such as linear interpolation and polynomial interpolation, and any interpolation method may be used as long as the accuracy required by a user of the present embodiment is reached through full cross-validation when predicting the environment. This is also true for interpolation of environmental parameters other than temperature. Based on the law that "a 100 m increase in elevation results in 0.6° C. decrease in temperature", the temperature values at the plot points on the environment map at 0 m above sea level are corrected to values converted in terms of the original height above sea level by using the topographical data, thereby creating an environment map (temperature map) of the temperature at the original height above sea level.

(Interpolating Absolute Humidity)

Absolute humidity can be calculated from the temperature and relative humidity among the environmental parameters. The atmospheric corrosive environment is characterized by "almost constant absolute humidity even when the temperature changes". Thus, using the above characteristic, an environment map of absolute humidity (absolute humidity map) is created by calculating the absolute humidity of each mesh point from the temperature and relative humidity and interpolating the data between pieces of the absolute humidity data on the map, without reflecting the topographical data such as elevation.

(Interpolating Relative Humidity)

For interpolating relative humidity, by using the characteristic of the atmospheric corrosive environment described above, that is, "almost constant absolute humidity even when the temperature changes", relative humidity is calculated at each mesh point of the environment maps of temperature and absolute humidity, thereby creating an environment map of relative humidity.

(Interpolating Time of Wetness)

With regard to time of wetness, the international standard defines it as "the time when the relative humidity is 80% or higher". Therefore, an environment map of time of wetness (time of wetness map) is created by calculating the annual time of wetness by integrating the time of 80% or higher relative humidity at each mesh point from a temporal change map of the hourly and daily relative humidity using the above method.

(Interpolating Rainfall)

Since rainfall is not affected by topography, an environment map of rainfall (rainfall map) is created by interpolating between pieces of rainfall data on the map without reflecting topographical data such as elevation.

(Interpolating Amount of Airborne Sea Salt, $SO_x$ Concentration, and $NO_x$ Concentration)

For interpolating amount of airborne sea salt, $SO_x$ concentration, and $NO_x$ concentration, the data between them are interpolated based on the Euclidean distance of longitude, latitude, and elevation, thereby creating environment maps of amount of airborne sea salt, $SO_x$ concentration, and $NO_x$ concentration (amount of airborne sea salt map, $SO_x$ concentration map, and $NO_x$ concentration map).

The amount of airborne sea salt is specifically calculated by a model equation "$y=ax^{-b}$". In this model equation, x is a distance from a coast (km), y is an amount of airborne sea salt (mdd), and a and b are coefficients. The distance from coast x is the minimum distance from each point of coastline shape data. The amount of airborne sea salt may be calculated using existing corrosion prediction equations such as the Cole model and meso-meteorological model in addition to the above model equation.

When interpolating the amount of airborne sea salt, it is preferable to set an upper limit for the amount of airborne sea salt to avoid abnormally high amounts of airborne salt if the mesh points are close to the coastline. For example, a value such as "1.0 mdd=62.3 mmd" can be set as the upper limit of the amount of airborne sea salt.

(Predicting Corrosion Loss)

In the prediction of the corrosion loss of metal materials, the corrosion loss is predicted for each mesh of the environment maps created as described above. The inventors of the present invention have found out that prediction accuracy improves by separately predicting a parameter A (a first parameter) indicating a corrosion loss of a metal material in an initial 1 year in each atmospheric corrosive environment and a parameter B (a second parameter) indicating attenuation of a corrosion rate by a rust layer and, in the prediction, performing prediction from data with weighting performed on environmental parameters.

A corrosion rate of a metal material generally attenuates with the lapse of time. This is caused by a protective effect by a corrosive product (a rust layer, for example) produced on the surface of the metal material. This protective effect significantly varies depending on an ambient environment and the type of the metal material. Thus, the corrosion rate of the metal material involves extremely many factors such as various environments and the corrosion resistance of the metal material. Consequently, it is extremely difficult to predict the corrosion loss of the metal material in a given environment and period with high accuracy from the rules and principles of the relation between the environmental parameters and the corrosion loss; it is realistic to predict the corrosion loss of the metal material statistically from a data group of the corrosion loss and the environmental parameters accumulated in a database, for example, which also leads to accuracy improvement.

In general, not many pieces of long-term data are in the accumulated data group of the corrosion loss and the environmental parameters. For example, when the given period for which the corrosion loss is predicted is a long term as long as a few tens of years, when the period is incorporated into the prediction as a variable to directly predict the corrosion loss, the corrosion loss of the given long term is predicted from data of a remote period, thus degrading accuracy. Given these circumstances, the present invention separately predicts the parameter A indicating the corrosion loss of the metal material in the initial 1 year and the parameter B indicating attenuation of the corrosion rate by the rust layer to improve accuracy.

Figure 1:
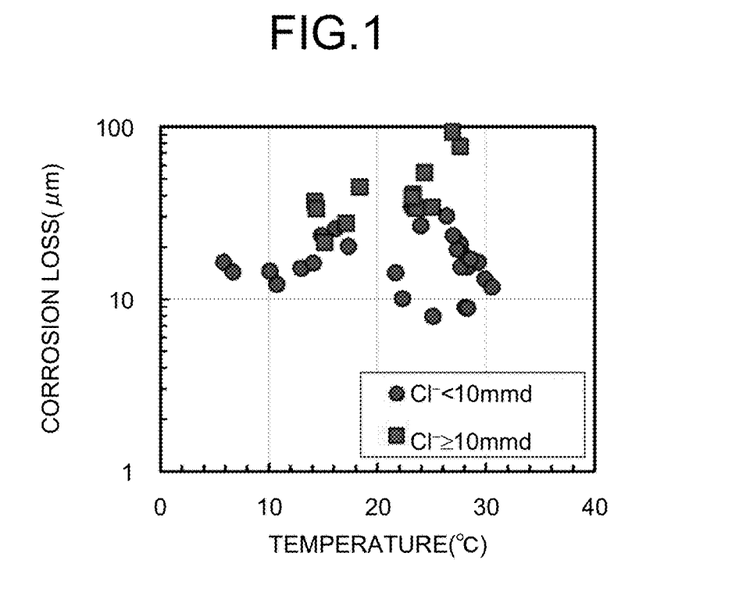
FIG. 1 is a graph of a relation between temperature (annually averaged) and a corrosion loss (annual) in an atmospheric corrosive environment.
Figure 2:
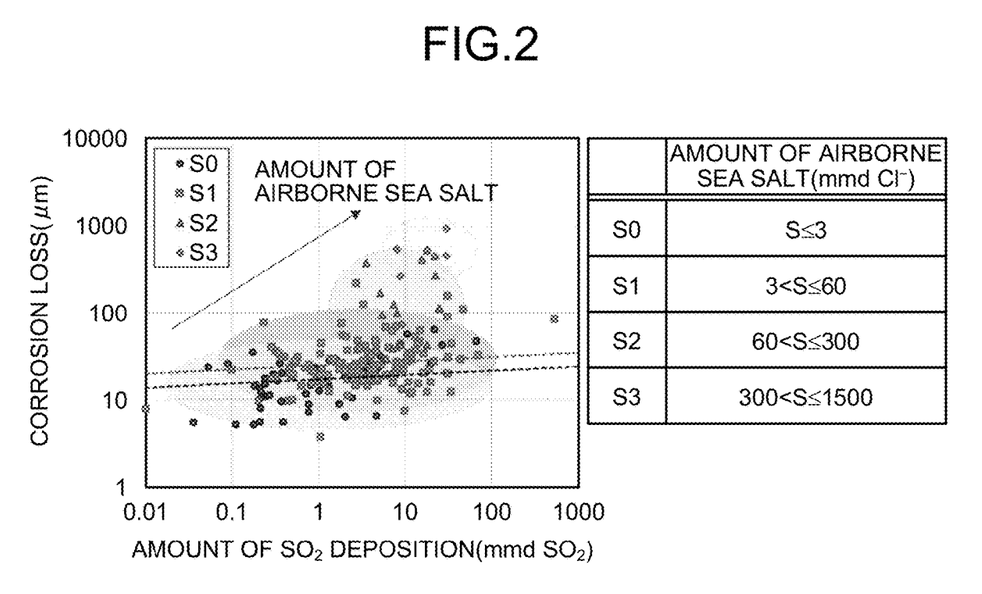
FIG. 2 is a graph of a pseudocorrelation between $SO_2$ concentration (annually averaged) and amount of airborne sea salt (annually averaged) in the atmospheric corrosive environment.

Examples of main environmental parameters related to the corrosion loss of the metal material in the given period include temperature, relative humidity, absolute humidity, time of wetness, rainfall, amount of airborne sea salt, $SO_x$ concentration, and $NO_x$ concentration. Among these environmental parameters, some have a nonlinear relation such as the relation between temperature and the corrosion loss illustrated in FIG. 1, for example. Some environmental parameters have multicollinearity such as the relation between amount of airborne sea salt and $SO_2$ concentration illustrated in FIG. 2, for example. In addition to the fact that there are a plurality of environmental parameters having an influence on the corrosion of the metal material, these two points cause difficulty in predicting the corrosion loss of the metal material in the given environment and period with high accuracy.

For any environmental parameter having a nonlinear relation with the corrosion loss, weighting is performed on each sample by similarity with a given environment and period for which prediction is desired to be performed, and multiple regression analysis is locally performed, whereby prediction accuracy can be improved. The above "sample" means the data group of the corrosion loss and the environmental parameters stored in the database (corrosion loss data described below).

The fact that the environmental parameters have multicollinearity can be dissolved by performing dimensional compression to a parameter having independence to the environmental parameters to create a new parameter. "Locally weighted partial least squares (LW-PLS)" described in Reference Literature 1 below is a method that simultaneously achieves these points.

Reference Literature 1: Kim Sanghong, Okajima Ryota, Kano Manabu, and Hasebe Shinji, "Sample selection to construct accurate locally weighted PLS models", 54th Automatic Control Joint Lecture Meeting, 54(2011), p. 1594

The present invention uses a method that determines similarity (a similarity degree) of the parameter A indicating the corrosion loss of the metal material in the initial 1 year in each atmospheric corrosive environment and the parameter B indicating attenuation of the corrosion rate by the rust layer with a prediction request point for each sample, performs weighting using the similarity degree, and performs local regression to perform prediction. The environmental parameters are dimensionally compressed to create a new parameter (derivation of a latent variable), which serves as an explanatory variable of local regression. In that process, the latent variable is determined such that the inner product of the latent variable using the weighting using the similarity degree and a response variable is maximized to perform local multiple regression. The following describes a specific embodiment of the present invention with reference to the accompanying drawings.

(Corrosion Loss Mapping Apparatus)

Figure 3:
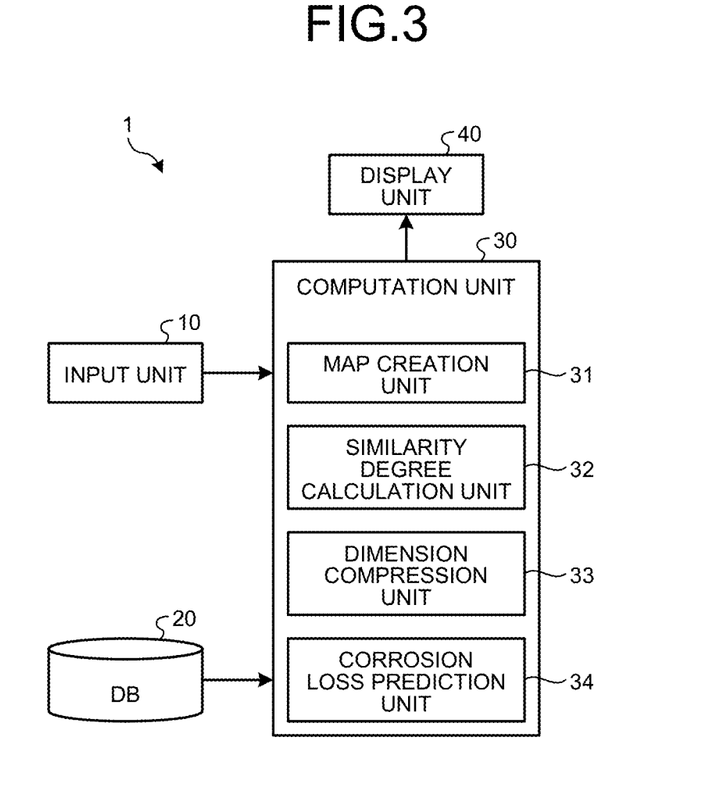
FIG. 3 is a block diagram of a configuration of a metal material corrosion loss mapping apparatus according to an embodiment of the present invention.

The following describes a configuration of the metal material corrosion loss mapping apparatus according to the embodiment of the present invention with reference to FIG. 3. This corrosion loss mapping apparatus 1 includes an input unit 10, a database 20, a computation unit 30, and a display unit 40.

The input unit 10 is implemented by an input apparatus such as a keyboard, a mouse pointer, or a numeric keypad. As described below, the prediction request point described below is input to the computation unit 30 via this input unit 10.

The database 20 stores therein the corrosion loss data as actual values of the corrosion loss of the metal material. The corrosion loss data includes a use period of the metal material (a steel material, for example), the corrosion loss of the metal material in the use period, a plurality of environmental parameters indicating a use environment of the metal material in the use period and being known on a map indicating a region in which the metal material is used, position coordinates of the environmental parameters on the map, and topographical data of the map.

The above "environmental parameters" described above include at least one of temperature (atmospheric temperature), relative humidity, absolute humidity, time of wetness, and rainfall, and at least one of amount of airborne sea salt, $SO_x$ concentration, and $NO_x$ concentration. These environmental parameters are annually averaged data, for example. In addition, the database 20 stores therein the corrosion loss data for each steel type.

The computation unit 30 is, specifically, implemented by a processor consisting of a central processing unit (CPU), a digital signal processor (DSP), a field-programmable gate array (FPGA), and the like, and a memory (main memory) consisting of a random access memory (RAM), a read only memory (ROM), and the like.

The computation unit 30, for example, loads a program stored in a storage unit not illustrated in the drawings into the working area of the main memory, execute the program, and controls each component or the like through the execution of the program, thereby implementing a function that meets a certain purpose. Through the execution of the program, the computation unit 30 functions as a map creation unit 31, a similarity degree calculation unit 32, a dimension compression unit 33, and a corrosion loss prediction unit 34. The details of the map creation unit 31, the similarity degree calculation unit 32, the dimension compression unit 33, and the corrosion loss prediction unit 34 will be described below.

The display unit 40 is implemented by a display apparatus such as a liquid crystal display (LCD) or a cathode ray tube (CRT) display and displays a corrosion loss prediction map as a prediction result of the corrosion loss of the metal material based on display signals input from the computation unit 30. The above "corrosion loss prediction map" indicates a map in which a predicted value of the corrosion loss is indicated by, for example, a color (refer to FIG. 5 and FIG. 6).

(Corrosion Loss Mapping Method)

Figure 4:
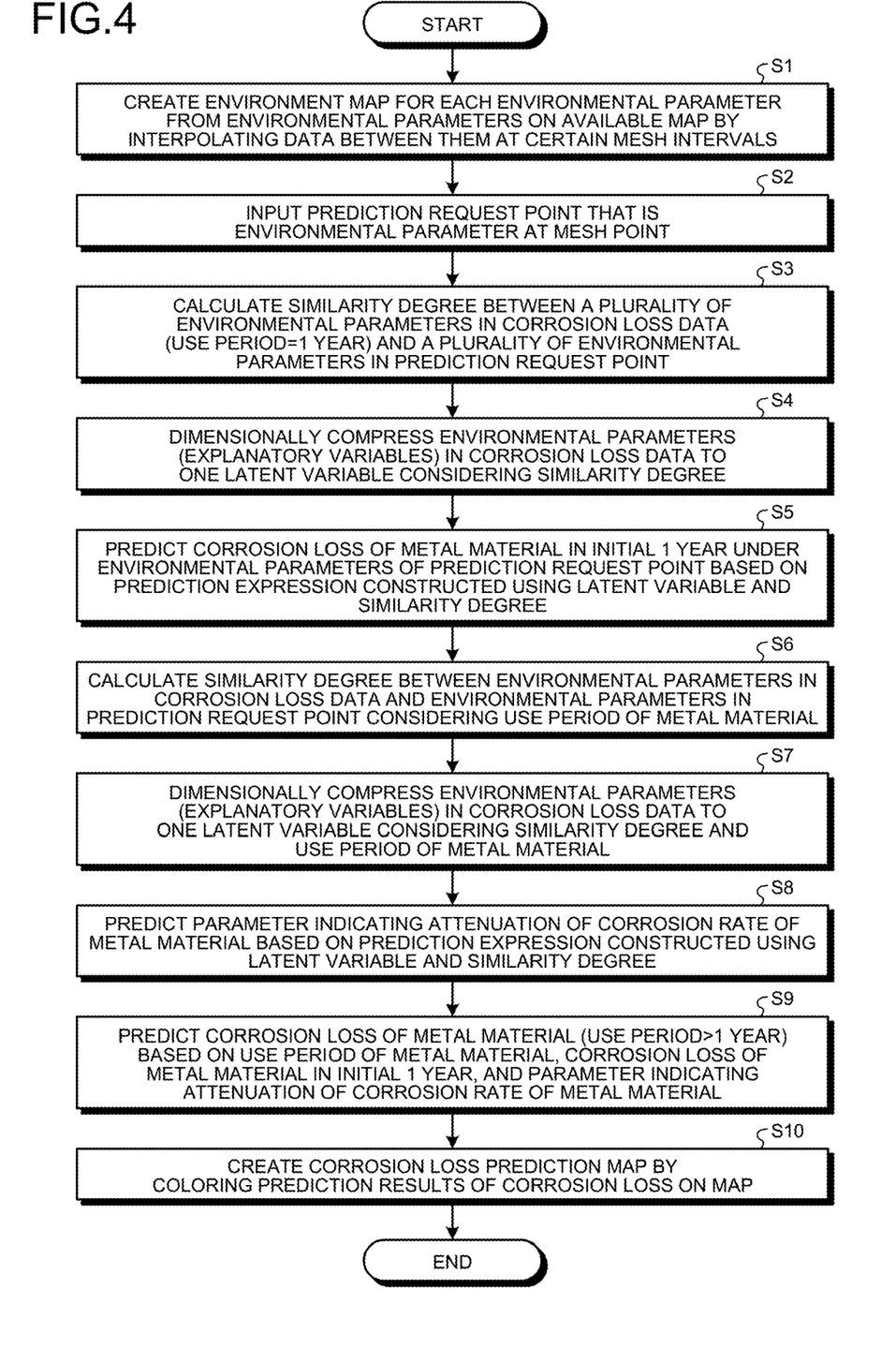
FIG. 4 is a flowchart of a procedure of a metal material corrosion loss mapping method according to the embodiment of the present invention.

The following describes the metal material corrosion loss mapping method according to the embodiment of the present invention with reference to FIG. 4. The corrosion loss mapping method performs an environment map creation step, a prediction request point input step, a first similarity degree calculation step, a first dimension compression step, an initial corrosion loss prediction step (a first parameter prediction step), a second similarity degree calculation step, a second dimension compression step, an attenuation prediction step (a second parameter prediction step), a long-term corrosion loss prediction step, and a corrosion loss prediction map creation step. The corrosion loss mapping method according to the present embodiment can predict and map the corrosion loss more accurately when it is applied to metal materials, especially to steel materials such as weathering steel.

At the environment map creation step, the map creation unit 31 creates an environment map for each environmental parameter from available environmental parameters on a map by interpolating the data between them at certain mesh intervals (Step S1).

At the environment map creation step, an environment map is created for each environmental parameter at certain mesh intervals, based on a plurality of known environmental parameters on the map, the topographical data of the map, and the position coordinates of the environmental parameters on the map. At the environment map creation step, the following four steps are performed more specifically.

First, the known multiple environmental data is input to the position coordinates on the map described above (first step). Subsequently, based on the topographical data of the map, the environment map is corrected to an environment map at 0 m above sea level (second step). Subsequently, environmental parameters between the known environmental parameters are interpolated in the environment map at 0 m above sea level (third step). Subsequently, based on the topographical data of the map, the environment map at 0 m above sea level with interpolated environmental parameters is corrected to the environment map at the original height above sea level (fourth step).

At the third step described above, when interpolating the amount of airborne sea salt at mesh points close to a coastline, it is preferable to interpolate the amount of airborne sea salt such that the amount of airborne sea salt does not exceed a predetermined upper limit (e.g., 1.0 mdd), as described above. By setting an upper limit to the amount of airborne sea salt, it is possible to avoid abnormally high levels of amount of airborne sea salt at mesh points close to a coastline.

At the prediction request point input step, a prediction request point including environmental parameters at a mesh point is input to the computation unit 30 via the input unit 10 (Step S2). This prediction request point includes a use period of a metal material for which a corrosion loss is desired to be predicted (a use period of a metal material for which a corrosion loss prediction map is created) and a plurality of annually averaged environmental parameters (a plurality of environmental parameters in the corrosion loss data) indicating a use environment of the metal material in this use period.

Subsequently, at the first similarity degree calculation step, the similarity degree calculation unit 32 calculates a similarity degree between a plurality of environmental parameters in the corrosion loss data of the metal material the use period of which is 1 year stored in the database 20 and a plurality of environmental parameters in the prediction request point (Step S3). At the present step, the similarity degree calculation unit 32 calculates the similarity degree by Expression (8) described below, for example. Specific examples of the present step will be described in the examples described below.

Subsequently, at the first dimension compression step, the dimension compression unit 33 dimensionally compresses the environmental parameters (explanatory variables) in the corrosion loss data to a latent variable considering the similarity degree calculated at the first similarity degree calculation step (Step S4). At the present step, the dimension compression unit 33 calculates the latent variable by Expression (7) described below, for example. Specific examples of the present step will be described in the examples described below.

Subsequently, at the initial corrosion loss prediction step, the corrosion loss prediction unit 34 predicts a corrosion loss of the metal material in an initial 1 year under the environmental parameters of the prediction request point based on a prediction expression constructed using the latent variable calculated at the first dimension compression step and the similarity calculated at the first similarity degree calculation step (Step S5). This corrosion loss of the metal material in the initial 1 year means the parameter A (the first parameter) in Expression (1) above. At the present step, the corrosion loss prediction unit 34 constructs a prediction expression presented in Expression (10) described below, for example, and predicts the corrosion loss of the metal material in the initial 1 year based on this prediction expression. Specific examples of the present step will be described in the examples described below.

Subsequently, at the second similarity degree calculation step, the similarity degree calculation unit 32 calculates a similarity degree between the environmental parameters in the corrosion loss data of the metal material and the environmental parameters in the prediction request point considering the use period of the metal material for which the corrosion loss is desired to be predicted (Step S6). At the present step, the similarity degree calculation unit 32 calculates the similarity degree by Expression (13) described below, for example. Specific examples of the present step will be described in the examples described below.

Subsequently, at the second dimension compression step, the dimension compression unit 33 dimensionally compresses the environmental parameters (explanatory variables) in the corrosion loss data to a latent variable considering the similarity degree calculated at the second similarity degree calculation step and the use period of the metal material for which the corrosion loss is desired to be predicted (Step S7). At the present step, the dimension compression unit 33 calculates the latent variable by Expression (12) described below, for example. Specific examples of the present step will be described in the examples described below.

Subsequently, at the attenuation prediction step, the corrosion loss prediction unit 34 predicts a parameter indicating attenuation of the corrosion rate of metal material based on a prediction expression constructed using the latent variable calculated at the second dimension compression step and the similarity degree calculated at the second similarity degree calculation step (Step S8). This parameter indicating attenuation of the corrosion rate of the metal material means the parameter B (the second parameter) in Expression (1) above. At the present step, the corrosion loss prediction unit 34 constructs a prediction expression presented in Expression (16) described below, for example, and predicts the parameter indicating attenuation of the corrosion rate of the metal material based on this prediction expression. Specific examples of the present step will be described in the examples described below.

Subsequently, at the long-term corrosion loss prediction step, the corrosion loss prediction unit 34 predicts a corrosion loss of the metal material in a period longer than 1 year (a long-term corrosion loss) based on the use period of the metal material, the parameter A calculated at the initial corrosion loss prediction step, and the parameter B calculated at the attenuation prediction step (Step S9). At the present step, the corrosion loss prediction unit 34 predicts the long-term corrosion loss based on Expression (1) above. Specific examples of the present step will be described in the examples described below.

Subsequently, at the corrosion loss prediction map creation step, the map creation unit 31 creates a corrosion loss prediction map by coloring a prediction result of the corrosion loss at the prediction request point in the mesh on the map (Step S10). This corrosion loss prediction map is a map that is colored for each mesh according to the corrosion loss values predicted at the corrosion loss prediction map creation step (refer to FIG. 5 and FIG. 6 below, for example).

As in the foregoing, the metal material corrosion loss mapping method using the corrosion loss mapping apparatus 1 according to the present embodiment can perform long-term corrosion prediction of a metal material with high accuracy in an atmospheric corrosive environment. In addition, the corrosion loss of a metal material can be mapped with high accuracy and an optimum metal material having corrosion resistance corresponding to a use environment can be selected.

When the environmental parameters employed as the explanatory variables are selected to perform formulation as in conventional techniques such as Patent Literature 1 to 5, prediction accuracy varies by region for which the corrosion loss is to be predicted such as being high in prediction accuracy in one region and being low in prediction accuracy in another region. In contrast, according to the metal material corrosion loss prediction method according to the present embodiment, prediction can be performed when the database 20 stores therein corrosion loss data similar to that of a region for which the corrosion loss is to be predicted, and thus the corrosion loss of the metal material can be predicted with high accuracy in any region.

EXAMPLES

Example 1

The following describes the present invention in more detail with reference to examples. In the present example, an annual corrosion loss (a corrosion loss in an initial 1 year) of a steel material in an environment under the eaves in Vietnam was predicted, and a corrosion loss prediction map was created. The contents of the present example correspond to the environment map creation step, the prediction request point input step, the first similarity degree calculation step, the first dimension compression step, the initial corrosion loss prediction step, and the corrosion loss prediction map creation step in the corrosion loss mapping method described above.

In the present example, using a data group of annual corrosion loss of the steel material in worldwide 55 regions and annually averaged environmental parameters (the corrosion loss data) stored in the database, an annual corrosion loss was predicted. In the present example, the following four environmental parameters were used: temperature (° C.), relative humidity (%), amount of airborne sea salt (mnd (in terms of $Cl^-$)), and $SO_2$ concentration (mmd (in terms of $SO_2$)). The above "mmd" is the amount of $Cl^-$ or $SO_2$ collected per unit number of days and unit area and is an abbreviation of "$mg \cdot m^{-2} \cdot day^{-1}$".

The environment map for each environmental parameter was created using the method described above. In this example, the calculation was performed using linear interpolation as a method of interpolation between pieces of data ("the environment map creation step" in FIG. 4). As described above, in the corrosion prediction at mesh points in the obtained environment map, it is known that when the explanatory variables have a correlation, prediction accuracy degrades due to multicollinearity. In LW-PLS described above, the environmental parameters used as the explanatory variables have a correlation, and thus the correlation is excluded by dimension compression to create a new parameter (latent variable). LW-PLS performs calculation in accordance with a procedure described in Reference Literature 1 described above. An expression for compressing the four environmental parameters to the latent variable (a parameter t) can be presented as Expression (7) below.

$$t = w_1 T + w_2 RH + w_3 Cl + w_4 SO2 \qquad (7)$$

In Expression 7 above, T is temperature (° C.), RH is relative humidity (%), Cl is an amount of airborne sea salt ($mg/m^2/day$ (=mmd) (in terms of $Cl^-$)), SO2 is a $SO_2$ concentration ($mg/m^2/day$ (=mmd) (in terms of $SO_2$)), and $w_1$ to $w_4$ are coefficients. While Expression 7 above includes only four environmental parameters as an example, in practice, it is preferable to include all environmental parameters that are predicted to relate to corrosion in a region for which the corrosion loss is to be predicted.

In the present example, first, a prediction request point including a use period of the steel material for which the corrosion loss is desired to be predicted and a plurality of annually averaged environmental parameters indicating a use environment of the steel material in this use period were input to the computation unit of the corrosion loss mapping apparatus ("the prediction point input step" in FIG. 4).

Subsequently, a similarity degree co between the environmental parameters of the prediction request point for which the corrosion loss is desired to be predicted and environmental parameters i of the corrosion loss data referred to for the prediction of the corrosion loss was calculated using a Euclidean distance presented in Expression (8) below ("the first similarity degree calculation step" in FIG. 4). The environmental parameters vary in the spread of data, and thus the values were normalized.

$$\omega_i = \exp\left(-\frac{\sqrt{(T_q - T_i)^2 + (RH_q - RH_i)^2 + (Cl_q - Cl_i)^2 + (SO2_q - SO2_i)^2}}{\sigma \varphi}\right) \quad (8)$$

In the expression, w is a localization parameter, the environmental parameters with a lower-right suffix of q are the environmental parameters of the prediction request point for which the corrosion loss is desired to be predicted, the environmental parameters with a lower right suffix of i are the environmental parameters of the corrosion loss data referred to from the database, and o is a standard deviation of Expression (9) below. The letter φ is an adjustment parameter; the value is determined by being adjusted as appropriate based on φ=1, for example.

$$\sqrt{(T_q-T_i)^2+(RH_q-RH_i)^2+(Cl_q-Cl_i)^2+(SO2_q-SO2_i)^2}(i=1,2,\ldots,N) \quad (9)$$

Subsequently, from the similarity degree w calculated by Expression (8) above, the environmental parameters of the corrosion loss data, and the corrosion loss, in accordance with a procedure described in Reference Literature 1 (Chapter 2.1), the coefficients $w_1$ to $w_4$ in Expression (7) above were determined such that the inner product of the latent variable multiplied by the similarity degree $\omega_i$ as weight and the response variable (the corrosion loss) was maximized. Using the determined coefficients $w_1$ to $w_4$, the latent variable of the environmental parameters was calculated by Expression (7) above ("the first dimension compression step" in FIG. 4).

Subsequently, a prediction expression of the corrosion loss present in Expression (10) below was constructed by local regression, and an annual corrosion loss of the steel material (the corrosion loss in the initial 1 year) under the environmental parameters of the prediction request point was predicted based on Expression (10) below ("the initial corrosion loss prediction step" in FIG. 4)

$$Y=\alpha t \quad (10)$$

In the expression, Y is a predicted value of the corrosion loss, and α is a coefficient (a regression coefficient). While being omitted in Expression (10) above, a constant term may be included or a plurality of latent variables may be used in Expression (10).

Figure 5:
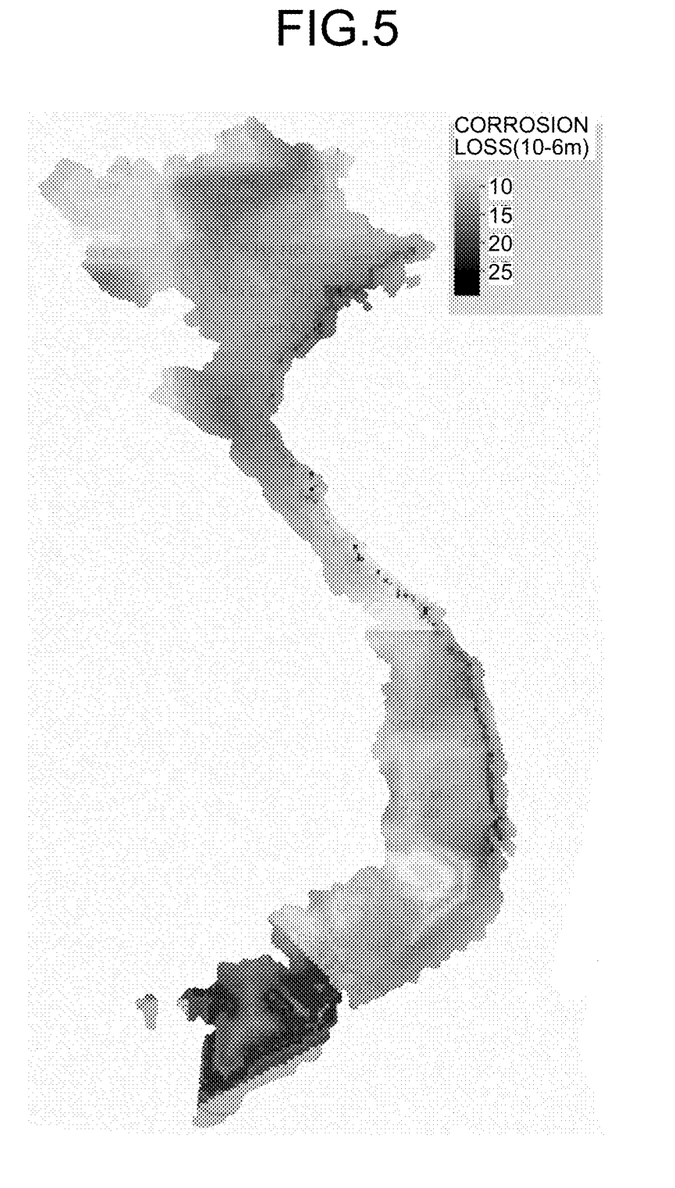
FIG. 5 is a corrosion loss prediction map of predicted values of corrosion loss of a metal material after 1 year obtained by a metal material corrosion loss mapping method according to a conventional technique.

Thus, the present example performs calculation of the similarity degree between the prediction request point and each corrosion loss data, calculation of the coefficients of the latent variable, and construction of the prediction expression each time the prediction request point for which the corrosion loss is desired to be predicted is input. The obtained predicted values of the annual corrosion loss for the respective mesh points are mapped as a corrosion loss prediction map, for example, as illustrated in FIG. 5 ("the corrosion loss prediction map creation step" in FIG. 4), and displayed by the display unit 40.

Example 2

In the present example, a long-term (50-year) corrosion loss of a steel material in an environment under the eaves in Vietnam was predicted, and a corrosion loss prediction map was created. The contents of the present example correspond to all the steps of the corrosion loss mapping method described above.

In the present example, using a data group of corrosion loss of worldwide 55 regions in 1 year, the 55 regions in 3 years, 39 regions in 5 years, 38 regions in 7 years, and the 38 regions in 9 years and annually averaged environmental parameters (the corrosion loss data) stored in the database for the environment under the eaves, the parameter A (refer to Expression (1) above) indicating the corrosion loss in the initial 1 year was calculated for a steel material by a method similar to that of Example 1 (the environment map creation step, the prediction request point input step, the first similarity degree calculation step, the first dimension compression step, and the initial corrosion loss prediction step in FIG. 4).

Subsequently, weighting was performed on a 7-year long-term corrosion test result, the parameter B indicating attenuation of the corrosion rate by the rust layer was calculated, and the corrosion loss of the steel material after 50 years was predicted by Expression (1) above. In the prediction of the corrosion loss after 50 years, first, Expression (1) above was transformed as presented in Expression (11) below, and then a difference between the logarithm of the corrosion loss in the initial 1 year and the logarithm of the corrosion loss after 50 years on the left side was calculated using the parameter B and the use period X.

$$\log Y - \log A = B \log X \quad (11)$$

For the prediction of the left side of Expression (11) above, LW-PLS is used. Specifically, four environmental parameters are multiplied by the logarithm of the use period X to create new environmental parameters considering a time factor, and these new environmental parameters are compressed to a latent variable (a parameter u) as presented in Expression (12) below.

$$u=(v_1 T+v_2 RH+v_3 Cl+v_4 SO2)\log X \quad (12)$$

In Expression (12) above, T is temperature (° C.), RH is relative humidity (%), Cl is an amount of airborne sea salt (mg/m²/day (=mmd) (in terms of Cl⁻)), SO2 is a $SO_2$ concentration (mg/m²/day (=mmd) (in terms of $SO_2$)), and $v_1$ to $v_4$ are coefficients.

Subsequently, a similarity degree $\omega_i$ between the environmental parameters of the prediction request point for which the corrosion loss is desired to be predicted and environmental parameters i of the corrosion loss data referred to for the prediction of the corrosion loss was calculated using a Euclidean distance presented in Expression (13) below ("the second similarity degree calculation step" in FIG. 4). The environmental parameters vary in the spread of data, and thus the values were normalized.

$$\omega_i = \exp\left(-\frac{\sqrt{(T_q \log X_q - T_i \log X_i)^2 + (RH_q \log X_q - RH_i \log X_i)^2 + (Cl_q \log X_q - Cl_i \log X_i)^2 + (SO2_q \log X_q - SO2_i \log X_i)^2}}{\sigma \varphi}\right) \quad (13)$$

In the expression, $\omega_i$ is a localization parameter, the environmental parameters with a lower-right suffix of q are the environmental parameters of the prediction request point for which the corrosion loss is desired to be predicted, the environmental parameters with a lower right suffix of i are the environmental parameters of the corrosion loss data referred to from the database, and $\sigma$ is a standard deviation of Expression (14) below. The letter $\varphi$ is an adjustment parameter; the value is determined by being adjusted as appropriate based on $\varphi=1$, for example.

$$\sqrt{(T_q \log X_q - T_i \log X_i)^2 + (RH_q \log X_q - RH_i \log X_i)^2 + (Cl_q \log X_q - Cl_i \log X_i)^2 + (SO2_q \log X_q - SO2_i \log X_i)^2} \quad (14)$$

$(i = 1, 2, \ldots, N)$

Subsequently, from the similarity degree w calculated by Expression (13) above, the environmental parameters of the corrosion loss data, and the corrosion loss, in accordance with the procedure described in Reference Literature 1 (Chapter 2.1), the coefficients $v_1$ to $v_4$ in Expression (12) above were determined such that the inner product of the latent variable multiplied by the similarity degree w as weight and the response variable (the corrosion loss) was maximized. Using the determined coefficients $v_1$ to $v_4$, the latent variable of the environmental parameters was calculated by Expression (7) above ("the second dimension compression step" in FIG. 4).

Subsequently, a prediction expression of the corrosion loss presented in Expression (15) below was constructed by local regression, and a difference of the logarithm of the corrosion loss in an environmental parameter desired to be predicted was calculated.

$$\log Y - \log A = \beta u \quad (15)$$

In Expression (15) above, $\beta$ is a coefficient (a regression coefficient). While being omitted in Expression (15) above, a constant term may be included or a plurality of latent variables may be used in Expression (15).

Thus, the present inventive example performs calculation of the similarity degree between the prediction request point and each piece of corrosion loss data, calculation of the coefficients of the latent variable, and construction of the prediction expression each time the prediction request point for which the corrosion loss is desired to be predicted is input.

Subsequently, the parameter B in Expression (11) above was calculated by Expression (16) below based on Expression (12) above and Expression (15) above ("the attenuation prediction step" in FIG. 4).

$$B = \frac{\beta u}{\log X} = \beta(v_1 T_q + v_2 RH_q + v_3 Cl_q + v_4 SO2_q) \quad (16)$$

Figure 6:
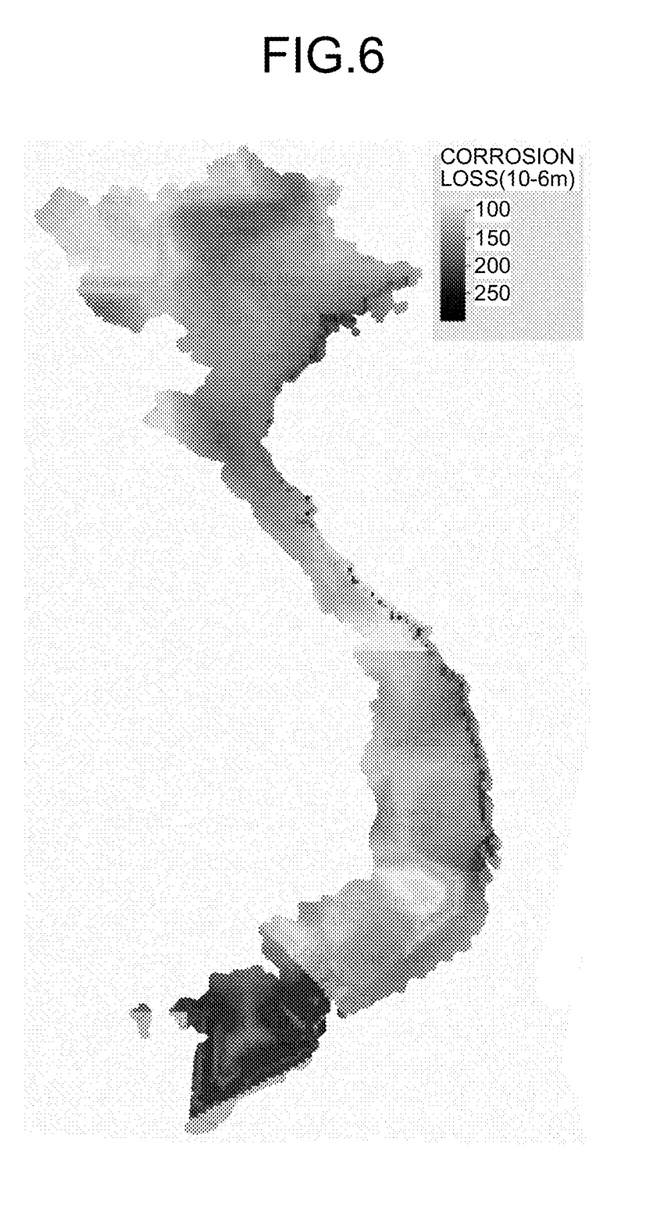
FIG. 6 is a corrosion loss prediction map of predicted values of corrosion loss of the metal material after 50 years obtained by the metal material corrosion loss mapping method according to the embodiment of the present invention.

Subsequently, a corrosion loss Y after 9 years was calculated by Expression (1) above using the calculated parameter A and parameter B (the long-term corrosion loss prediction step in FIG. 4). The obtained predicted values of the long-term corrosion loss for the respective mesh points are mapped as a corrosion loss prediction map, for example, as illustrated in FIG. 6 ("the corrosion loss prediction map creation step" in FIG. 4), and displayed by the display unit 40.

The foregoing has specifically described the metal material corrosion loss mapping method, the metal material selection method, and the metal material corrosion loss mapping apparatus according to the present invention through the embodiment for performing the invention and the examples; the gist of the present invention should not be limited to these descriptions and be interpreted widely based on the descriptions of the claims. In addition, it goes without saying that various changes and modifications on the basis of these descriptions are also included in the gist of the present invention.

The embodiment described above separately predicts the corrosion loss of the metal material in the initial 1 year (the parameter A) and the parameter indicating attenuation of the corrosion rate of the metal material (the parameter B) and predicts the long-term corrosion loss based on the corrosion loss in the initial 1 year; the standard in predicting the long-term corrosion loss is not limited to the corrosion loss in the initial 1 year.

That is to say, at the initial corrosion loss prediction step, the corrosion loss of the metal material in a given certain period set in advance (an initial period) may be predicted, and at the long-term corrosion loss prediction step, the long-term corrosion loss may be predicted based on the corrosion loss in the certain period described above.

When a corrosion loss in 1.5 years is given as A' as the initial corrosion loss, for example, it is considered that a prediction expression of the corrosion loss after X years from then can be described as Expression (17) below by expanding Expression (1) above.

$$Y = A(X/1.5)^B \quad (17)$$

where X is the number of years that has elapsed

When this expression is generalized, Expression (18) below can be obtained with A' as a corrosion loss in a certain initial period $X_0$ years and B' as an attenuation parameter based on the $X_0$ years. Using this Expression (18), a corrosion loss in the period $X > X_0$ can be calculated as a corrosion loss based on the $X_0$ years.

$$Y = A'X'^{B'} = A'(X/X_0)^{B'} \quad (18)$$

The corrosion loss A' of the metal material in the given initial period and the attenuation parameter B' are separately predicted, and as presented in Expression (18) above, the number of years X' that has elapsed after the initial period to the attenuation parameter B'th power can predict the long-term corrosion loss after the initial period. However, the initial corrosion loss A in Expression (1) above is predicated on the corrosion loss in 1 year. Thus, the period $X_0$ in Expression (18) above does not assume a case significantly deviated from 1 year; its realistic practical range is considered to be about a half year to 2 years.

REFERENCE SIGNS LIST

1 Corrosion loss mapping apparatus
10 Input unit
20 Database
30 Computation unit
31 Map creation unit
32 Similarity degree calculation unit 33 Dimension compression unit
34 Corrosion loss prediction unit
40 Display unit

The invention claimed is:

1. A metal material corrosion loss mapping method comprising:

predicting a corrosion loss of a metal material using corrosion loss data, the corrosion loss data including a use period of the metal material, a plurality of environmental parameters indicating a use environment of the metal material in the use period and being known on a map indicating a region in which the metal material is used, position coordinates of the environmental parameters on the map, topographical data of the map, and a corrosion loss of the metal material in the use period; and creating a corrosion loss prediction map, wherein the metal material corrosion loss mapping method comprises:

an environment map creation step of creating, for each of the environmental parameters, an environment map on which each of the environmental parameters is plotted at certain mesh intervals based on the environmental parameters, the topographical data of the map, and the position coordinates of the environmental parameters on the map;

a prediction request point input step of inputting a prediction request point including a use period of the metal material for which the corrosion loss prediction map is created and a plurality of environmental parameters in the corrosion loss data;

a similarity degree calculation step of calculating a similarity degree between the environmental parameters in the corrosion loss data and the environmental parameters in the prediction request point;

a dimension compression step of dimensionally compressing the environmental parameters in the corrosion loss data to a latent variable considering the similarity degree;

a corrosion loss prediction step of predicting a corrosion loss of the metal material in the prediction request point in the mesh based on a prediction expression constructed using the latent variable and the similarity degree;

a corrosion loss prediction map creation step of creating the corrosion loss prediction map by coloring a prediction result of the corrosion loss at the prediction request point in the mesh; and a corrosion loss prediction map display step of causing the corrosion loss prediction map to be displayed with the colored prediction result on a display based on display signals, wherein the environment map creation step includes:
a first step of inputting the environmental parameters to the position coordinates on the map,
a second step of correcting the environment map to an environment map at 0 m above sea level based on the topographical data of the map,
a third step of interpolating environmental parameters between the environmental parameters on the environment map at 0 m above sea level, in accordance with characteristics of each of the environmental parameters, and
a fourth step of correcting the environment map at 0 m above sea level with the interpolated environmental parameters to the environment map at the original height above sea level based on the topographical data of the map, the environmental parameters include an amount of airborne sea salt, and the third step interpolates the amount of airborne sea salt such that the amount of airborne sea salt does not exceed a predetermined upper limit when interpolating the amount of airborne sea salt in a mesh close to a coastline.

2. The metal material corrosion loss mapping method according to claim 1, wherein the corrosion loss prediction step includes:

an initial corrosion loss prediction step of predicting a first parameter indicating a corrosion loss of the metal material in a certain period;

an attenuation prediction step of predicting a second parameter indicating attenuation of a corrosion rate of the metal material; and a long-term corrosion loss prediction step of predicting a corrosion loss of the metal material in a period longer than the certain period based on the use period of the metal material, the first parameter, and the second parameter.

3. The metal material corrosion loss mapping method according to claim 2, wherein the initial corrosion loss prediction step predicts the corrosion loss of the metal material in the certain period under the environmental parameters in the prediction request point based on the prediction expression constructed using the latent variable and the similarity degree.

4. The metal material corrosion loss mapping method according to claim 2, wherein the attenuation prediction step predicts the second parameter based on the use period of the metal material for which the corrosion loss prediction map is created, the environmental parameters in the corrosion loss data, and the similarity degree.

5. The metal material corrosion loss mapping method according to claim 1, wherein the environmental parameters include at least one of temperature, relative humidity, absolute humidity, time of wetness, and rainfall, and at least one of an amount of airborne sea salt, $SO_x$ concentration, and $NO_x$ concentration.

6. The metal material corrosion loss mapping method according to claim 1, wherein the metal material is a steel material.

7. The metal material corrosion loss mapping method according to claim 1, wherein the corrosion loss prediction map is a map that is colored for each mesh according to a corrosion loss value predicted at the corrosion loss prediction map creation step.

8. A metal material selection method comprising:
selecting a metal material corresponding to a use environment using the metal material corrosion loss mapping method according to claim 1.

9. The metal material corrosion loss mapping method according to claim 1, wherein the dimension compression step uses locally weighted partial least squares to dimensionally compress the environmental parameters to the latent variable.

10. A metal material corrosion loss mapping apparatus comprising:
a database configured to store therein corrosion loss data including a use period of a metal material, a plurality of environmental parameters indicating a use environment of the metal material in the use period and being known on a map indicating a region in which the metal material is used, position coordinates of the environmental parameters on the map, topographical data of the map, and a corrosion loss of the metal material in the use period;

an environment map creation unit configured to create, for each of the environmental parameters, an environment map on which each of the environmental parameters is plotted at certain mesh intervals based on the environmental parameters, the topographical data of the map, and the position coordinates of the environmental parameters on the map;

an input unit to which a prediction request point is input, the prediction request point including a use period of the metal material for which a corrosion loss prediction map is created and a plurality of environmental parameters in the corrosion loss data;

a similarity degree calculation unit configured to calculate a similarity degree between the environmental parameters in the corrosion loss data and the environmental parameters in the prediction request point;

a dimension compression unit configured to dimensionally compress the environmental parameters in the corrosion loss data to a latent variable considering the similarity degree;

a corrosion loss prediction unit configured to predict a corrosion loss of the metal material in the prediction request point in the mesh based on a prediction expression constructed using the latent variable and the similarity degree;

a corrosion loss prediction map creation unit configured to create the corrosion loss prediction map by coloring a prediction result of the corrosion loss at the prediction request point in the mesh; and a corrosion loss prediction map display unit configured to cause the corrosion loss prediction map to be displayed with the colored prediction result on a display based on display signals, wherein the environment map creation unit is further configured to:
input the environmental parameters to the position coordinates on the map,
correct the environment map to an environment map at 0 m above sea level based on the topographical data of the map,
interpolate environmental parameters between the environmental parameters on the environment map at 0 m above sea level, in accordance with characteristics of each of the environmental parameters, and
correct the environment map at 0 m above sea level with the interpolated environmental parameters to the environment map at the original height above sea level based on the topographical data of the map, the environmental parameters include an amount of airborne sea salt, and the environment map creation unit is further configured to interpolate the amount of airborne sea salt such that the amount of airborne sea salt does not exceed a predetermined upper limit when interpolating the amount of airborne sea salt in a mesh close to a coastline.

* * * * *